United States Patent
McIntyre et al.

(10) Patent No.: US 12,164,595 B2
(45) Date of Patent: *Dec. 10, 2024

(54) CALCULATING RISK SCORE ASSOCIATED WITH A PHYSICAL STRUCTURE FOR A NATURAL DISASTER PERIL USING HAZARD AND VULNERABILITY MODELS

(71) Applicant: Delos Space Corporation, San Francisco, CA (US)

(72) Inventors: Shanna Marie McIntyre, Oakland, CA (US); Kevin Anand Stein, Alameda, CA (US); David Samaan Saah, Pleasanton, CA (US); Chao Xie, Newcastle, WA (US)

(73) Assignee: Delos Space Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,717

(22) Filed: Oct. 5, 2023

(65) Prior Publication Data
US 2024/0028668 A1    Jan. 25, 2024

Related U.S. Application Data

(63) Continuation of application No. 16/705,068, filed on Dec. 5, 2019, now Pat. No. 11,836,216.
(Continued)

(51) Int. Cl.
*G06F 18/2113* (2023.01)
*G06F 17/18* (2006.01)
(Continued)

(52) U.S. Cl.
CPC .......... *G06F 18/2113* (2023.01); *G06F 17/18* (2013.01); *G06F 18/214* (2023.01);
(Continued)

(58) Field of Classification Search
CPC .. G06F 18/2113; G06F 18/214; G06F 18/251; G06F 17/18; G06N 20/20; G06N 5/01
See application file for complete search history.

(56) References Cited

U.S. PATENT DOCUMENTS 11,430,069 B1   8/2022  Pedersen et al.
11,836,216 B1*  12/2023 McIntyre ............ G06F 18/2113
(Continued)

OTHER PUBLICATIONS

Office Action for U.S. Appl. No. 16/705,068, mailed on Mar. 15, 2023, Inventor #1 Shanna Marie Mcintyre, "Calculating Risk Score Associated With a Physical Structure for a Natural Disaster Peril Using Hazard and Vulnerability Models", 13 pages.

*Primary Examiner* — Pinalben Patel
(74) *Attorney, Agent, or Firm* — Lee & Hayes, P.C.

(57) ABSTRACT

Examples described herein include methods and computing systems which may include examples of calculating risk scores for certain natural disasters perils based on machine learning model outputs. For example, a machine learning model may weight each of the pixels of a map in accordance with the set of weights associated with a structure, to calculate a risk score for a particular natural disaster peril associated with that structure. A plurality of risk selections may be provided to a user computing device for selection by a user, with those risk selections being associated with that risk score. Advantageously, the computing system facilitates the interaction of datasets with different measurement parameters in a machine learning model. In normalizing datasets before providing the datasets to input nodes of a machine learning model, a computing system may efficiently provide hazard and vulnerability outputs of the machine learning model.

20 Claims, 7 Drawing Sheets

Related U.S. Application Data

(60) Provisional application No. 62/775,605, filed on Dec. 5, 2018, provisional application No. 62/775,609, filed on Dec. 5, 2018.

(51) Int. Cl.
  *G06F 18/214* (2023.01)
  *G06F 18/25* (2023.01)
  *G06N 5/01* (2023.01)
  *G06N 20/20* (2019.01)

(52) U.S. Cl.
  CPC .............. *G06F 18/251* (2023.01); *G06N 5/01* (2023.01); *G06N 20/20* (2019.01)

(56) References Cited

U.S. PATENT DOCUMENTS

| | | |
|---|---|---|
| 2014/0132409 A1 | 5/2014 | Billman et al. |
| 2014/0372150 A1 | 12/2014 | Karle et al. |
| 2017/0169534 A1 | 6/2017 | Wani et al. |
| 2019/0176987 A1 | 6/2019 | Beecham |
| 2021/0279852 A1 | 9/2021 | Jakka et al. |
| 2022/0036302 A1 | 2/2022 | Cella et al. |

\* cited by examiner

CALCULATING RISK SCORE ASSOCIATED WITH A PHYSICAL STRUCTURE FOR A NATURAL DISASTER PERIL USING HAZARD AND VULNERABILITY MODELS

CROSS-REFERENCE TO RELATED APPLICATIONS

This application is a continuation of and claims priority to U.S. patent application Ser. No. 16/705,068, filed Dec. 5, 2019, which claims the benefit under 35 U.S.C. 119 of provisional applications 62/775,605 and 62/775,609, both filed Dec. 5, 2018. All of these applications are hereby incorporated herein by reference in their entirety for any purpose.

BACKGROUND

Insurers typically use detailed questionnaires and on-site inspectors in order to determine how well a property has been maintained in order to mitigate losses from a natural disaster such as wildfires, hurricanes, and earthquakes. This qualitative characterization of a property is a component of insurance risk assessment, but is not well-defined. Accordingly, there is a need for methods and systems to determine risk to a property with at least some quantitative precision, so as to help mitigate losses from natural disasters.

Additionally, to mitigate such losses, property owners may make modifications to their property, so as to mitigate a loss. For example, a property owner on a floodplain may add earth and/or dirt around their property so as to mitigate the potential impact from a flood. Such property maintenance activities may reduce the risk to that property for a particular natural disaster. However, property owners often do not have access to precision equipment (e.g., satellites) or data from such precision equipment (e.g., satellite data) to identify where such changes to a property could be made to mitigate such risk. Accordingly, there is a need for methods and systems to determine which risk mitigation activities to take for a certain property.

DETAILED DESCRIPTION

Figure 1:
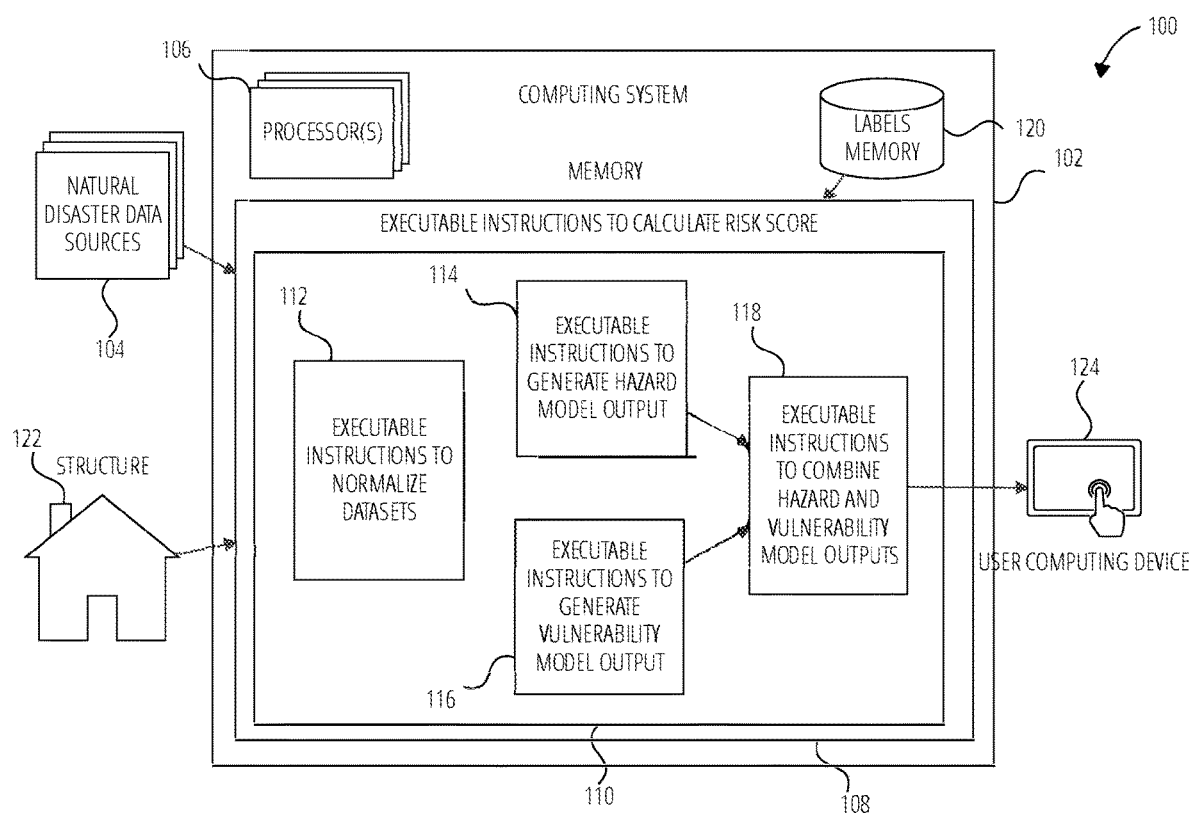
FIG. 1 is a schematic illustration of a system 100 arranged in accordance with examples described herein.

Examples described herein include methods and computing systems which may include examples of calculating risk scores for certain natural disasters perils based on machine learning model outputs. Embodiments of machine learning processing for natural disaster risks have been described, for example, in U.S. Application Nos. 62/775,605 and 62/775,609, which applications are incorporated herein by reference in their entirety for any purpose. As described herein, computing systems are employed to calculate risk scores using natural disaster risk indicator data. For example, such natural disaster risk indicator data may be historical data and/or real-time data received from devices that take measurements of certain data in real-time as defined by those devices. Accordingly, any such data may be received from various natural disaster data sources, including but not limited to: satellite data, aerial data (e.g., image data from a drone), weather stations/sources, government data sources (e.g., National Weather Service, property inspection reports), commercial entities (e.g., insurance companies), user devices (e.g., a consumer smartphone device equipped with a camera), and/or Internet of Things (IoT) devices (e.g., an IoT device in a physical structure capable of detecting seismic data). Natural disaster indicator data, from such natural disaster data sources, may include data regarding a certain property, such as data indicative of vegetation location, vegetation condition, topography, weather data/patterns in a region of that property (e.g., historical natural disaster data for a particular region), structure information of a physical structure on that property (e.g., historical structure loss), property condition(s), or consumer/user behavior (e.g., evacuation routes of consumers in a given region).

Once natural disaster indicator data is obtained or received from such natural disaster data sources, the computing system includes executable instructions that, when executed, may cause the computing system to execute a machine learning model using all or a portion of the natural disaster risk indicator data. For example, the machine learning model may be stored on a memory that stores executable instructions to calculate risk scores, and also stores various executable instructions to execute the machine learning model, such as: executable instructions to normalize data sources, executable instructions to generate hazard model output, executable instructions to generate vulnerability model output, and/or executable instructions to combine hazard and vulnerability model outputs. In executing such instructions, the computing system calculates a risk score that is utilized to provide a user of a user computing device a plurality of risk selections, which may be associated with one or more risk mitigation activities. Accordingly, a user, who may own a property, may use the computing system to obtain a plurality of risk selections to select one or more risk mitigation activities to mitigate a natural disaster risk associated with that property. For example, a risk mitigation activity for a wildfire natural disaster peril may include changing some aspects of the structure or the property grounds such as removing certain vegetation adjacent to the property. Systems and methods described herein calculate risk scores for various natural disaster perils so as to provide users with a plurality of risks selections based on the calculated risk scores.

In some implementations, the machine learning model may include a memory that stores executable instructions to combine hazard and vulnerability model outputs, such that, when executed, the machine learning model calculates a risk score based on those outputs. For example, the machine learning model may weight each of the pixels of a map in accordance with the set of weights associated with a structure and/or property, to calculate a risk score for a particular natural disaster peril associated with the structure and/or property, such that a risk score is provided based on that calculation. The risk score may be used to provide an owner of the structure or the property grounds certain risk selections associated with that risk score, e.g., on a user computing device of the owner (e.g., smartphone). Accordingly, in various implementations, a user (e.g., owner of a structure or property grounds) of that user computing device may select certain risk selections of a plurality of risk selections that may be associated with a particular risk mitigation activity for the structure or the property grounds. As an example, a risk selection may be provided to be displayed on the user computing device that indicates: "Add ember mesh screen to westward windows." In such a case, the user may select that risk selection to notify the user regarding that risk mitigation activity, e.g., that activity may be added to a todo list of the user or calendared to notify the user regarding that risk mitigation activity. Additionally or alternatively, the calculated risk score may be provided to various risk mitigation services (e.g., vegetation removal), municipal standard agencies (e.g., building code development or home builder standards development), or insurance underwriters that use the risk score, in part, to determine a property insurance policy.

FIG. 1 is a schematic illustration of a system 100 arranged in accordance with examples described herein. System 100 includes a computing system 102, natural disaster data sources 104, structure 122, and user computing device 124. The computing system 102 receives natural disaster indicator data from natural disaster data sources 104, to calculate, at computing system 102, a risk score regarding a particular natural disaster peril based on the natural disaster indicator data associated with the structure 122. The structure 122 may be a physical structure such as a residential home (e.g., a single-family residence (SFR)), a duplex, an apartment complex, a condominium structure, a mobile home unit, a commercial structure, an agricultural structure (e.g., a silo or barn), an industrial structure, or any combinations thereof of such physical structures. Structure data regarding the structure 122 may also be received from by the computing system 102, such as from IoT devices at the structure 122 that provide measurements of environmental data around the structure 122, e.g., temperature, wind speed and/or other weather information. Property characteristic data regarding the physical property associated with the structure 122 may also be received by the computing system 102, such as from the IoT devices at the structure 122 or the natural disaster data sources 104 (e.g., a government-affiliated property assessor). For example, the physical property associated with the structure 122 may be a property that surrounds the structure 122, e.g., as defined in parcel information for that structure 122. Additionally or alternatively, property characteristic data may be received that is associated with a physical property that does not have a physical structure like the structure 122. In some implementations, the structure data may include all or a portion of the property characteristic data. Based on a calculated risk score for the structure 122, the computing system 102 provides a plurality of risk selections to a user computing device 124, where a user may select a particular risk selection that may be associated with a risk mitigation activity. As an example, a risk mitigation activity may include removing certain vegetation, such as branches from trees and/or trees themselves surrounding the structure 122. Other example risk mitigation activities may include, but are not limited to: installing hardware on the structure and/or property; removing "ladder fuels" near the structure (e.g., live or dead vegetation that allows a fire to spread upwards); changing a material of a roof or siding of the structure; cleaning defensible space, roof, or gutters of dead vegetation and debris from the structure and/or property; using ember protection devices and materials, or changing an aspect of the windows of the structure (e.g., changing from single pane to double pane).

The computing system 102 includes processor(s) 106, memory 108, and labels memory 120. The memory 108 may store, as encoded, one or more sets of executable instructions that, when executed by processor(s) 106, cause the computing system 102 to perform various operations. Such operations may provide, when executed by processor(s) 106, a calculated risk score or a plurality of risk selections to the user computing device 124 regarding the structure 122. The executable instructions are encoded on the memory 108 and include executable instructions to calculate risk score 110, executable instructions to normalize datasets 112, executable instructions to generate hazard model output 114, executable instructions to generate vulnerability model output 116, and executable instructions to combine hazard and vulnerability model outputs 118. The memory 108 or labels memory 120 may be computer-readable media. For example, computer-readable media includes both non-transitory computer storage media and communication media including any medium that facilitates transfer of a computer program (e.g., a set of executable instructions) from one place to another. In some implementations, memory 108 and labels memory 120 may reside on the same computer-readable medium.

The computing system 102 obtains or receives natural disaster indicator data from natural disaster data sources 104. The natural disaster data sources 104 may be smartphone, a satellite, a weather station, a ground sensor, a satellite receiver, a laptop, or a drone. The natural disaster data sources 104 may communicate the natural disaster indicator data over a communications network, such as a wired and/or wireless network to the computing system 102. In some implementations, the structure 122 may be a data source, such as a wireless data source associated with a physical structure (e.g., an IoT device). For example, a wireless user computing device at the structure 122 (e.g., an intelligent assistant or smarthome hub) may provide structure data to the computing system 102. In the example, a smarthome hub in the structure 122 or a wireless computing device at the structure 122 may obtain user input regarding the structure, such as information about the size of the structure, physical maintenance activities at the structure 122, or photos of the structure 122. As an example, a smartphone device, wirelessly connected to a wireless device of the structure 122, may obtain photos of a user performing physical maintenance at or surrounding the structure 122 (e.g., removing vegetation on or around the structure 122) or may receive user input regarding such structure data from the user inputting structure data to a device associated with the structure 122. Accordingly, the computing system 102 may receive or obtain user input comprising information about the structure 122 from the structure 122.

The computing system 102 may also obtain or receive different datasets from one or more of the natural disaster data sources 104. As an example, a dataset may be a spatial layer of a geographic information system (GIS) map. In some implementations, one or more spatial layers may be included in a raster image file. The GIS map may include data representative of a region that the structure 122 is located within (e.g., pixel level data of a parcel that the structure 122 resides on) or a region associated with the structure 122 (e.g., State of California). The spatial resolution of the spatial layers of one or more GIS maps obtained from one or more natural disaster data sources 104 may vary. For example, some GIS spatial layers may have a spatial resolution of 2.5 km, such that one pixel is representative of a 2.5 km level resolution. The spatial resolution may range, according to different GIS maps or GIS layers, such that the spatial resolution may be any of 1 m, 5 m, 10 m, 30 m, 50 m, 500 m, 1 km, 2.5 km, 5 km, 10 km, 100 km, or 1000 km, for example. A spatial layer may include data indicative of an ecoregion (e.g., a terrestrial ecoregion or biome as defined by the World Wildlife Foundation (WWF)), soils data, atmospheric data, elevation data, property inspection data (e.g., percentage of a building destroyed/damaged and/ or natural disasters having affected that property), weather index data, various fire risk data (e.g., an ignition risk based on a fire risk GIS model), particular historical data associated with a historical natural disaster, parcel boundary data, historical flame length data, historical flame intensity data, fire risk model data, historical fire data, moisture data, water data, and/or fire frequency data. Such datasets of GIS layers may also be obtained or received with a temporal resolution, such as datasets over various timepoints, including but not limited to: seconds, minutes, hours, periods of hours, days, months, years, or decades, for example. Accordingly, various datasets may be obtained from a GIS system to provide various spatial layers of a GIS map to the computing system 102. In some implementations, natural disaster data sources 104 may include government data regarding the structure 122, such as information from a government property assessor (e.g., a county property assessor). That structure 122 data may be obtained as parcel information associated with the structure 122. In some implementation, such obtained parcel information associated with the structure 122 may be referred to as the property characteristic data. For example, information about the property grounds associated with the structure may be obtained as part of the parcel information. That parcel information may also be one or more spatial layers of a GIS map. In some implementations, the spatial resolution of a GIS layer for parcel information may be a "parcel" resolution.

The obtained or received plurality of datasets from natural disaster data sources 104 may be provided, by processor(s) 106, to the memory 108 for execution of various executable instructions. For example, the computing system 102 may include certain I/O interfaces (e.g., I/O interfaces 312 as described with respect to FIG. 3) that may facilitate the provision of the natural disaster indicator data to the memory 108. Memory 108 stores a machine learning model comprising the various executable instructions that are stored in the memory 108. For example, the processor(s) 106 may implement the machine learning model to execute executable instructions to calculate risk score 110, which may include execute of executable instructions to normalize datasets 112, executable instructions to generate hazard model output 114, executable instructions to generate vulnerability model output 116, and/or executable instructions to combine hazard and vulnerability model outputs 118. Accordingly, the computing system 102 performs operations to calculate a risk score, when the processor(s) 106 executes, the executable instructions to calculate risk score 110, with such instructions including the feeding of the natural disaster indicator data to the machine learning model. In calculating the risk score, the computing system 102 may also perform operations to normalize the obtained datasets from the natural disaster data sources 104. For example, as described below with respect to method 700, when executable instructions to normalize datasets 112 are executed by processor(s) 106, the computing system 102 performs operations to normalize the datasets.

Continuing in the description of the computing system 102 being caused to perform certain operations, in calculating the risk score, the computing system 102 may perform operations to generate a hazard model output, to generate a vulnerability model output, or to combine hazard and vulnerability model outputs. For example, as described below with respect to method 600, the computing system 102 may be caused to perform operations to calculate a risk score and/or to provide a plurality of risk selections to the user computing device 124 as part of the system 100. In some implementations, as depicted in FIG. 1, the outputs from the execution of executable instructions to generate hazard model output 114 and executable instructions to generate vulnerability model output 116 may be provided for the execution of executable instructions to combine hazard and vulnerability model outputs 118. Once executable instructions to combine hazard and vulnerability model outputs 118 are executed by processor(s) 106, the computing system 102 is caused to provide the plurality of risk selections to the user computing device 124. Accordingly, the computing system 102 may provide such risk selections to a user of user computing device 124, which may facilitate the mitigation of physical losses to the structure 122, when certain risk mitigation activities associated with respective risk selections are selected at the user computing device 124 by the user. For example, the user computing device 124 may notify the user on a display of the user computing device 124 to take the risk mitigation activity with respect to the structure 122 and/or property (e.g., property grounds).

In some implementations, the machine learning model may include a hazard model and a vulnerability model which are trained based on obtained natural disaster indicator data, which may include real-time data or historical data. The historical natural disaster indicator data may be stored on labels memory 120, and may be referred to as labels in a machine learning context; such that when input data is provided to the machine learning model, the model may be trained based on the labels stored in labels memory 120. For example, the hazard model, when being trained on all or a portion of the label data, may be trained to provide hazard model output that comprises a map defined by a set of pixels, each pixel associated with a corresponding hazard probability for a particular natural disaster peril. In the example, data stored in labels memory 120 may include data indicative of that particular natural disaster peril (e.g., wildfire(s)), and the hazard model may be trained to generate hazard model output for a particular region associated with that data (e.g., State of California). Accordingly, in the example, a map of California may be generated, in computing system 102, with each pixel corresponding to a certain probability of that particular natural disaster peril (e.g., wildfire(s)) occurring in the region represented by the pixel. As another example, the vulnerability model, when being trained on all or a portion of the data stored in labels memory 120 may be trained to provide a vulnerability output that comprises a set of weights associated with the structure 122 and/or property. In the example, the data stored in labels memory 120 may include data indicative of various risks associated with the physical structure or property, such as vegetation, hazard mitigation components, and/or historical structure information (e.g., historical loss information for that structure). Accordingly, each weight that is generated, in computing system 102, is representative of a particular risk associated with the physical structure or property. In training the hazard and vulnerability models, the processor(s) 106 may cause the computing system 102 to store the trained hazard and vulnerability models in the memory 108, such that, when the computing system 102 is caused to perform the executable instructions to generate hazard model output 114 and the executable instructions to generate vulnerability model output 116, the respective hazard and vulnerability models are accessed to facilitate the generation of respective hazard model and vulnerability model outputs.

Additionally, in training the hazard and vulnerability models, the computing system 102 may perform various machine learning techniques to train the hazard and vulnerability models of the machine learning model based on the labels memory 120 and any natural disaster indicator data received from the natural disaster data sources 104. For example, the computing system 102 may utilize a random forest classifier technique to randomly group various datasets of obtained datasets in different "trees" for classification, so as to form a "forest" of decision "trees." In some implementations, the random forest classifier technique may be referred to as a machine learning algorithm. As different features are tested for each "tree," the computing system 102 may utilize the random forest classifier tree technique to construct k-classifier trees, where k is the number of trees, such that classification may occur with respect to any number of features in a given plurality of datasets on each k tree. In utilizing such a random forest classifier technique, the computing system 102 may train the machine learning model based on the labels memory 120, including particular aspects of hazard or vulnerability models. For example, in training a hazard model, the computing system 102 may provide the hazard model a certain set of datasets, while the computing system 102 may provide the vulnerability model a different set of datasets, e.g., at least one dataset differs from that of the set of datasets provided to the hazard model. In some implementations, structure data from structure 122 may be provided to the vulnerability model, but not to the hazard model for training. While training the hazard and vulnerability models have been described in the context of a random forest classifier technique, it can be appreciated that other machine learning techniques or algorithms may be utilized to train the hazard and vulnerability models.

Because the data stored in labels memory 120 is utilized to train the machine learning model using obtained datasets from the natural disaster data sources 104 and/or structure 122, the machine learning model may be trained to predict certain classifications of data when further datasets are obtained from natural disaster data sources 104 or structure 122, such that the computing system 102 may facilitate in providing risk selections to the user computing device 124 when calculating risk scores. For example, a trained machine learning model may obtain further datasets from natural disaster data sources 104, which when provided to the computing system 102 and the executable instructions to calculate risk score 110 are executed by processor(s) 106, the computing system 102 may calculate a risk score based on the natural disaster indicator data, which associates a particular natural disaster peril is likely for the structure 122. For example, datasets obtained may be indicative of a particular fire type (e.g., a wind-driven fire, a brush fire, or a canopy fire) and certain vegetation surrounding the structure 122 (e.g., bushes on the north side of the structure 122) to calculate a risk score indicative of that type of fire being a wildfire peril to the structure 122. The computing system 102 may provide risk selections to the user computing device 124, which may include a risk selection associated with a risk mitigation activity of removing certain vegetation to mitigate the risk of a natural disaster peril (e.g., removing the north side bushes to mitigate the risk of a bush fire to the structure 122).

In some implementations, additional or alternative machine learning techniques, beyond random forest classifiers, may be utilized to train the machine learning model with the obtained datasets from the natural disaster data sources 104 and/or structure 122. For example, convolutional networks, instead of random forest classifiers, may be utilized to train the machine learning model based on the labels memory 120, including particular aspects of hazard or vulnerability models. In various examples, any of a fully convolutional networks (e.g., a U-Net architecture) and/or a convolutional neural network (CNN) may be utilized to train the machine learning model. In some implementations, different machine learning techniques may be used on various different sets of datasets to determine which or combinations thereof train the machine learning model to classify the datasets with a certain level of prediction accuracy. As can be appreciated, a voting mechanism or count can be utilized to identify which classifiers or networks obtain a desired prediction accuracy level.

While FIG. 1 depicts a separate labels memory 120 being different than memory 108, it can be appreciated that, in some implementations, the data stored in labels memory 120 may be stored in memory 108. Additionally or alternatively, structure data may be obtained only from the natural disaster data sources 104, rather than the structure 122 itself. In some implementations, execution of executable instructions to normalize datasets 112 by processor(s) 106 may be optional such that the computing system 102 is not caused to perform operations to normalize the obtained datasets. However, in various implementations, the computing system 102 is caused to perform operations included in executable instructions to normalize datasets 112, as further detailed in FIG. 2.

Figure 2:
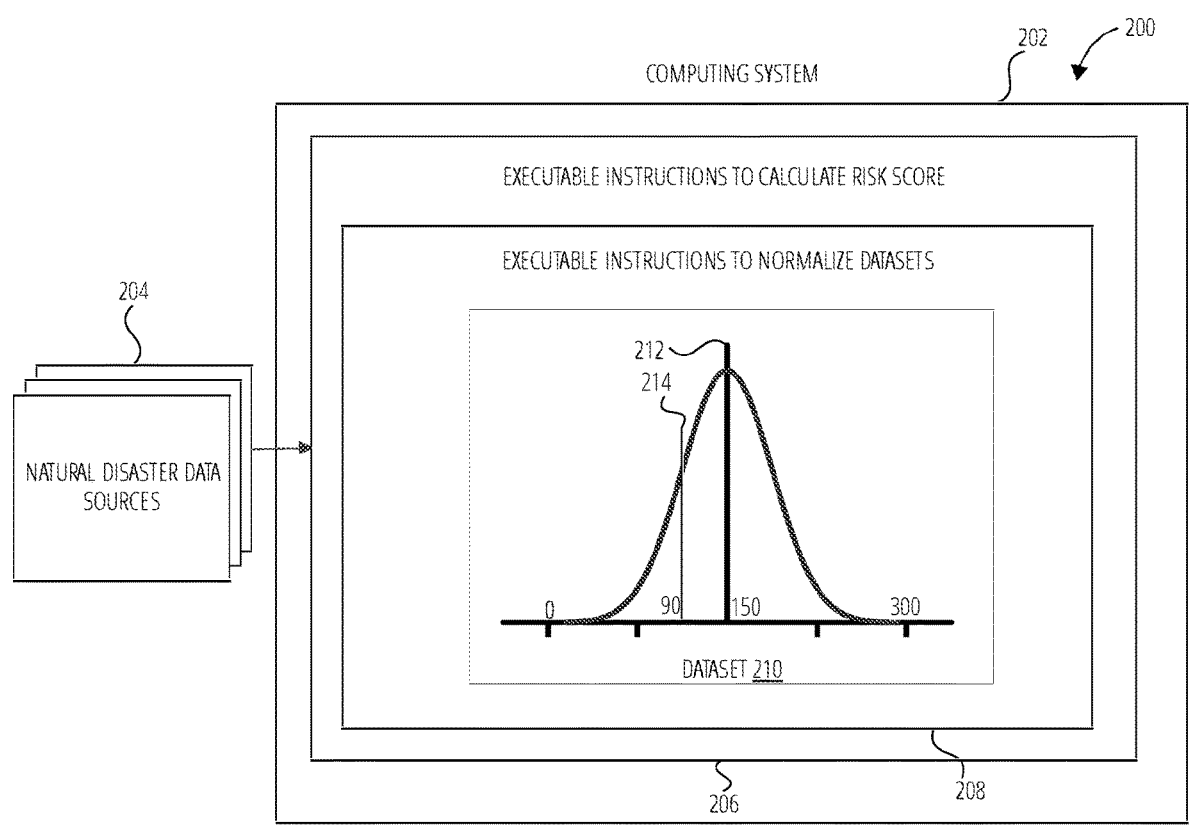
FIG. 2 is a schematic illustration of a system 200 arranged in accordance with examples described herein.

FIG. 2 is a schematic illustration of a system 200 arranged in accordance with examples described herein. The system 200 comprises a computing system 202 and natural disaster data sources 204. The computing system 202 and natural disaster data sources 204 are analogous in operation to that of computing system 102 and natural disaster data sources 104. Accordingly, in similar fashion, the computing system 202 obtains a plurality of datasets having natural disaster indicator data from natural disaster data sources 204. In analogous fashion to that of executable instructions to calculate risk score 110, the computing system 202 is caused to perform the executable instructions to calculate risk score 206 stored in a memory on the computing system 202. In calculating the risk score, the computing system 202 is also caused to perform operations to normalize datasets, such that computing system 202 is caused to perform executable instructions to normalize datasets 208, in an analogous fashion to the execution of executable instructions to normalize datasets 112 by processor(s) 106 of computing system 102. Accordingly, the computing system 202 is caused to normalize the datasets and/or structure data obtained from natural disaster data sources 204.

In normalizing the datasets, the executable instructions to normalize datasets 208 includes operations to combine, at an input layer of the machine learning model stored in a memory of computing system 202 (e.g., a memory 108), the obtained plurality of datasets and structure data, such that the input layer of the machine learning model is configured to feed a respective combined dataset, as input data, to a hazard model of the machine learning model or a vulnerability model of the machine learning model. For example, the executable instructions to normalize datasets 208 may include operations to perform the method 700, such that at least one normalized dataset is provided as a respective combined dataset to the input layer of the machine learning model. In executing the method 700, the executable instructions to normalize datasets 208 may perform operations to obtain a measurement parameter of the dataset 210, such as a measurement parameter associated with the dataset 210. In an example, the dataset 210 may be a set of historical flame lengths for a particular natural disaster peril. For example, the dataset 210 may be representative of flame lengths, in feet (ft), during certain days of a historical wildfire. Each pixel of a spatial layer in a GIS map may represent a particular flame length of the region that the GIS map is associated. In the example, a pixel in a region of California may represent a flame length of that historical wildfire for a particular day. Accordingly, the dataset 210 may be indicative of a distribution of values of that dataset 210 for that particular day (e.g., a Gaussian distribution). In the example, most pixels have a flame length of the dataset 210 have a 150 ft value. Accordingly, a threshold 212 is obtained as a median value for the dataset 210 to indicate a level of risk for the flame length on that particular day, e.g., a value over the threshold 212 is indicative of higher risk and a value under the threshold 212 is indicative of lower risk.

In the example, another threshold 214 is obtained as indicative of another level of risk. For example, the threshold 214 is associated with a 75 ft value. The threshold 214 is obtained from a memory of computing system 202 as an on-the-ground management activity. For example, certain historical data (which may be stored in a labels memory, like labels memory 120) may be identified as thresholds associated with on-the-ground management activity for that natural disaster peril. In the example, a 90 ft value may be representative of a specific level of risk associated with the natural disaster peril; in this example, a flame length that fire crews do not attempt to put out because that size of flame length may be perilous to a fire crew from a safety perspective. Accordingly, different threshold 212 and 214 may be obtained to normalize the dataset 210.

The computing system 202 may be caused to perform normalization on the dataset 210 based on the thresholds 212 and 214, so as to normalize the values of the dataset 210 to a value between 0 and 1. In the example, the threshold 214 may be set as 0.25 normalization value, while the threshold 212 may be set as 0.75 normalization value. For example, because the on-the-ground management activity may be an aspect of the historical natural disaster data that relates to other datasets (e.g., the 90 ft value flame length may be associated with a wind speed value that is also related to an on-the-ground management activity), the dataset 210 may be normalized such that the spatial relationships among obtained datasets is independent of any particular measurement parameter.

Additionally or alternatively, the thresholds 212 and 214 may be utilized to classify normalization ranges that relate to the on-the-ground management activities. In the example, as noted above, the 90 ft flame length value is associate with a specific level of risk that is related to fire crew safety; while the 150 ft flame length value may be related to a level of risk for helicopter that is to transport water to a fire to attempt to extinguish. For example, the 150 ft flame length value may indicate that a certain aerial distance is to be maintained from the fire when dumping the water on the fire. Accordingly, because the 75 and 150 ft values relate to certain on-the-ground management activities, ranges may be normalized based on those identified thresholds, to facilitate in providing a machine learning model that utilizes normalized values from associated normalized ranges. For example, ranges of values may be normalized to different normalization ranges to provide better resolution for data when it is compared to other normalized datasets. Advantageously, a machine learning model may generate outputs with better prediction accuracy because datasets are compared with normalized values and/or normalized ranges. For example, in contrast to comparing a 90 ft value of flame length to a percent weather value (e.g., 30% chance of precipitation value), the 90 ft value is normalized to 0.25 normalization value so that the flame length dataset may be more efficiently compared to a weather dataset, e.g., having percent values with a chance of precipitation. Accordingly, in some implementations, the normalization ranges are defined by the identified on-the-ground management activities, such that the depicted 0 to 90 ft flame length values are compressed to a to 0.25 normalized range; the 90 to 150 ft flame length values, compressed to to 0.75 normalized range; and any values over 150 ft flame length value, compressed to 0.75 to 1 normalized range. Accordingly, the plurality of flame length values that are between the 90 to 150 ft flame length values, which are normalized to the 0.25 to 0.75 normalized range, may be more emphasized in comparison to other datasets of machine learning model than if those values had not been normalized.

In executing the executable instructions to normalize datasets 208, a plurality of normalized datasets, using the obtained plurality of datasets including dataset 210, are generated by the computing system 202. The computing system 202 may select at least one normalized dataset of the generated plurality of normalized dataset to be provided as a respective combined datasets to either the hazard model or the vulnerability model. For example, input nodes of the hazard and vulnerability models are activated (e.g., input nodes of a machine learning model) to receive as input data respective combined datasets that were normalized. The combined datasets are utilized by the machine learning model to generate hazard and vulnerability outputs, independent of any particular measurement parameter of a respective dataset, such that spatial relationships among the datasets may be processed according to normalized values of that data.

Advantageously, the computing system 202 facilitates the interaction of various datasets with different measurement parameters in a machine learning model stored in the computing system 202. In normalizing the datasets before providing the datasets to input nodes of a machine learning model, the computing system 202 may efficiently provide hazard and vulnerability outputs of the machine learning model, which corresponding models may utilize the various normalized datasets, previously of differing measurement parameters before normalization, as normalized, combined datasets, to generate such outputs. Additionally or alternatively, in normalizing the datasets before providing the datasets to input nodes of a machine learning model, the computing system 202 may train hazard and vulnerability models of the machine learning model to utilize normalized datasets, previously of differing measurement parameters before normalization. For example, the computing system 202 may utilize the normalized, combined datasets to compare to labels data stored in a memory, to develop or update the machine learning model.

The computing system 202 solves a problem in machine learning processing and training, in that datasets are often provided to input nodes of machine learning models have different measurement parameters. Because the datasets are of different parameters, the data of interest in a given dataset may not be compared or processed by the machine learning model to another dataset so as to achieve a desired prediction accuracy. Continuing in the example of FIG. 2, if the dataset 210 had been provided as the Gaussian distribution that it is to input nodes of a machine learning model, the data surrounding the threshold 212 (e.g., a median value) would tend to be overemphasized in comparisons with other datasets because more values of that dataset are surrounding the threshold 212. However, in identifying the threshold 214 as corresponding to a specific level of risk (e.g., an on-the-ground management activity), the computing system 202 may facilitate the providing of a normalized dataset, such that other datasets may interact with the values surrounding the threshold 214 as 0.5 value rather than as the value 90 ft itself. Therefore, the spatial relationships among datasets provided to the machine learning model may be determined by the machine learning model, independently of any measurement parameters of a particular dataset provided to the machine learning model.

Figure 3:
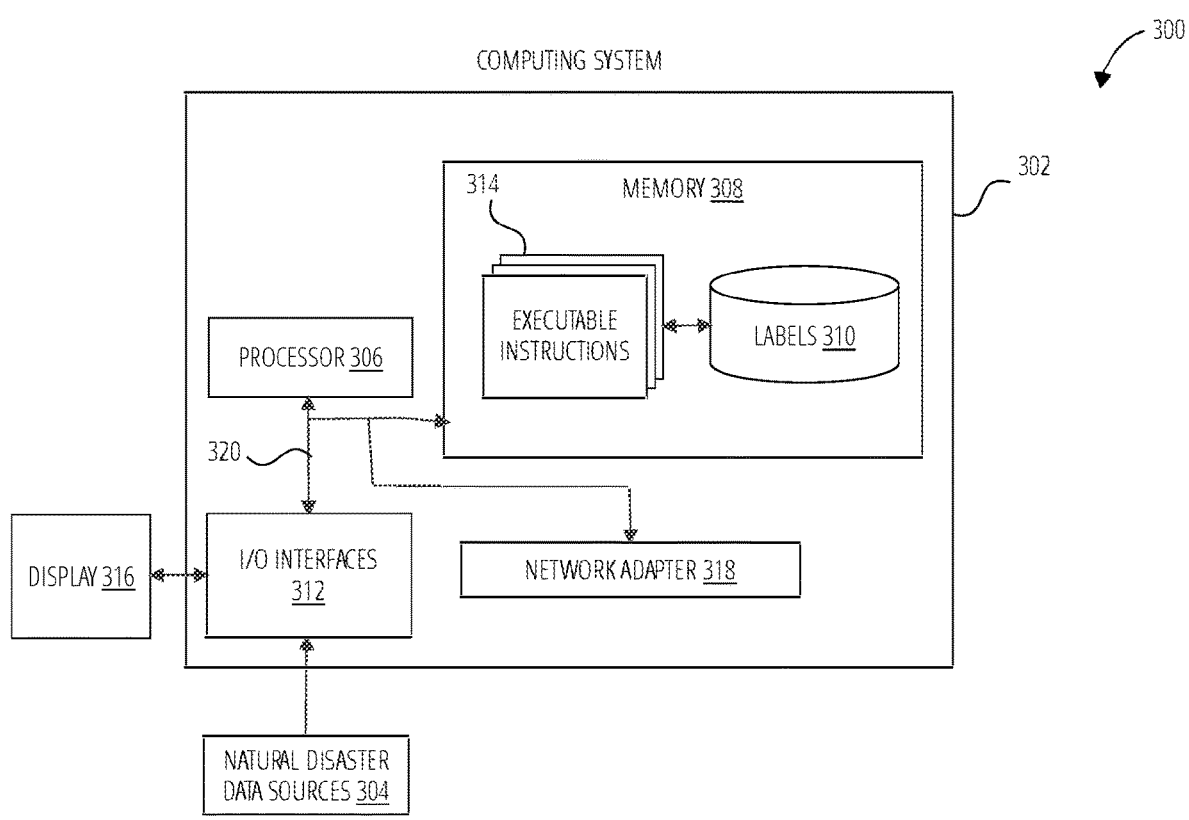
FIG. 3 is a schematic illustration of a system 300 arranged in accordance with examples described herein.

FIG. 3 is a schematic illustration of a system 300 arranged in accordance with examples described herein. The system 300 comprises a computing system 302 and natural disaster data sources 304. The computing system 302 and natural disaster data sources 304 are analogous in operation to that of computing system 102 and natural disaster data sources 104. Accordingly, in similar fashion, the computing system 302 obtains a plurality of datasets having natural disaster indicator data from natural disaster data sources 304. In analogous fashion to that of executable instructions to calculate risk score, the computing system 302 is caused to perform the executable instructions 314 to calculate risk score stored in the memory 308 on the computing system 302. In calculating the risk score, the computing system 302 is also caused to perform operations to normalize datasets, such that computing system 302 is caused to perform executable instructions 314 to normalize datasets by processor 306, in an analogous fashion to the execution of executable instructions to normalize datasets 112 by processor(s) 106 of computing system 102. Accordingly, the computing system 302 is caused to normalize the datasets and/or structure data obtained from natural disaster data sources 304. Additionally or alternatively, in calculating the risk score, the computing system 302 is also caused to perform operations to generate hazard model output, to generate vulnerability model output, and to combine hazard and vulnerability model outputs, such that computing system 302 is caused to perform analogous executable instructions 314 by processor 306; as that of executable instructions to generate hazard model output 114, executable instructions to generate vulnerability model output 116, and executable instructions to combine hazard and vulnerability model outputs 118 by processor(s) 106. Accordingly, labels memory 310 may interact analogously as labels memory 120, even while labels memory 310 is shown as part of memory 308 in the computing system 302.

As shown in FIG. 3, computing system 302 in system 300 is shown in the form of a general-purpose computing device. The system 300 obtains natural disaster indicator data, such as datasets, from the natural disaster data sources 304 to implement a machine learning model stored in memory 308. For example, the computing system 302 includes processor 306, a memory 308, and a bus 320 that couples various system components including memory 308 to processor 306.

The computing system 302 also includes I/O interfaces 312 connected to processor 306 via a bus 320 and network adapter 318 connected to processor 306 via the same bus 320. The bus 320 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. For example, the bus 320 may connect to the memory 308 via one or more data media sources.

Computing system 302 may also communicate with one or more natural disaster data sources 304 such as a keyboard & mouse (not depicted) or a display 316. Such I/O communication can occur via I/O interfaces 312. Generally, any I/O device or connection to one or more devices may enable a user to interact with computing system 302; and/or any devices (e.g., network card, modem, etc.) that enable computing system 302 to communicate with one or more other computing devices, such as via a wired or wireless connection to the natural disaster data sources 304. For example, computing system 302 can communicate with one or more networks such as a local area network (LAN), a general wide area network (WAN), and/or a public network (e.g., the Internet) via network adapter 318. As depicted, network adapter 318 communicates with the other components of computing system 302 via bus 320. Accordingly, the computing system 302 may receive or obtained datasets for processing or training of a machine learning model from natural disaster data sources 304 via I/O interfaces 312, display 316, or via network adapter 318.

Figure 4:
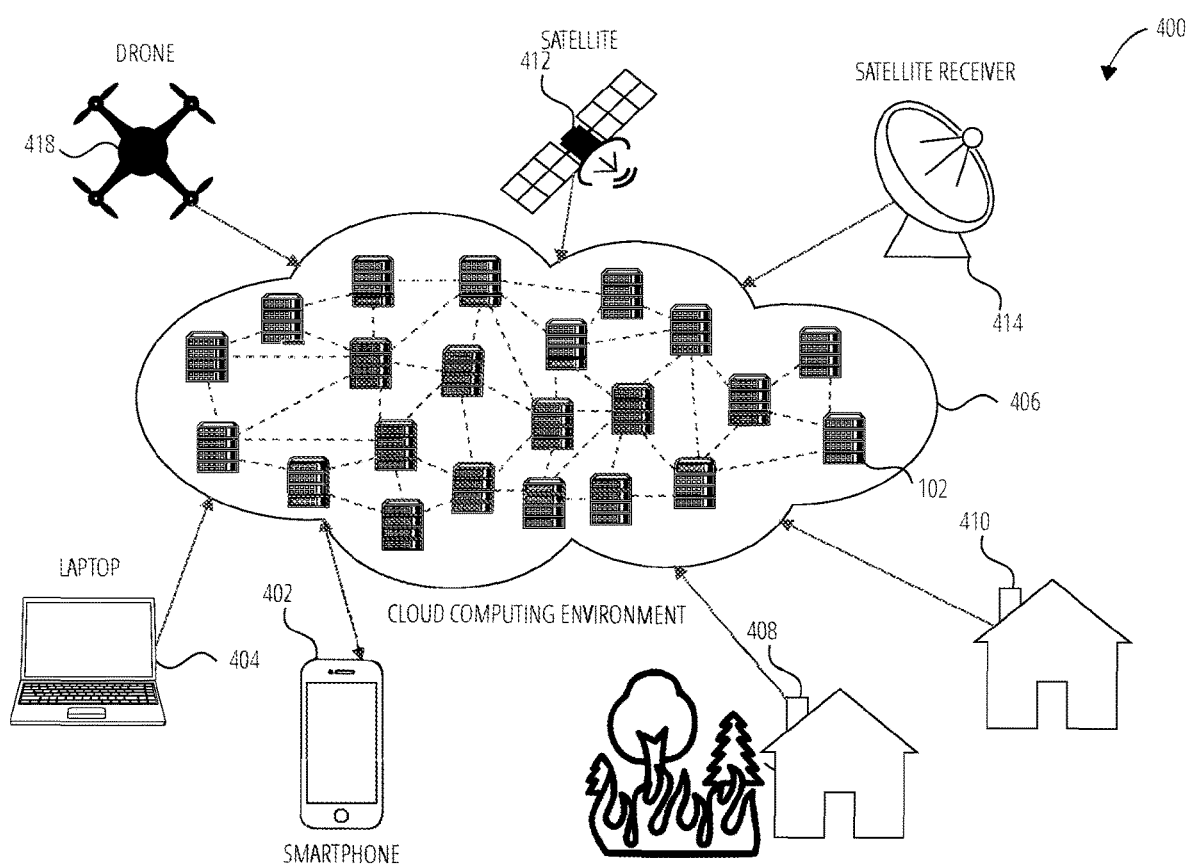
FIG. 4 is a schematic illustration of a system 400 arranged in accordance with examples described herein.

FIG. 4 is a schematic illustration of a system 400 arranged in accordance with examples described herein. The system 400 includes a cloud computing environment 406, having several computing devices 102, connected to natural disaster data sources such as smartphone 402, laptop 404, structures 408 and 410, satellite 412, satellite receiver 414, and drone 418. For example, structure data may be received from structure 408 having an IoT device that measures outside temperature, which may detect increased temperature indicative of natural disaster peril. The structure data may be received as a temperature dataset by the computing systems 102 with a temporal resolution as provided by the IoT device measuring the temperature. Accordingly, the computing systems 102 of the cloud computing environment 406 communicate with the various natural disaster data sources to obtain or receive datasets for processing or training of one or more machine learning models stored on respective computing systems 102 in the cloud computing environment 406. In some implementations, one or more of the computing systems 102 may be implemented as computing system 102, computing system 202, computing system 302, or any combinations thereof. The cloud computing environment 406 facilitates the providing of a machine learning model to calculate risk scores, so as to not require each computing system 102 to separately maintain datasets or labels data when datasets or labels data are acquired from the natural disaster data sources. For example, one of the computing systems 102 may maintain a labels memory (e.g., labels memory 120) that stores labels data for any of the computing systems 102 of the cloud computing environment 406. Additionally or alternatively, one of the computing systems 102 may maintain a memory (e.g., a memory 108) that stores datasets and/or structure data for any of the computing systems 102 of the cloud computing environment 406. As can be appreciated, the computing devices 102 shown in FIG. 4 are intended to be illustrative only in that the cloud computing environment 406 can communicate with any type of computerized device over any type of network and/or network/addressable connection (e.g., using a web browser).

Figure 5:
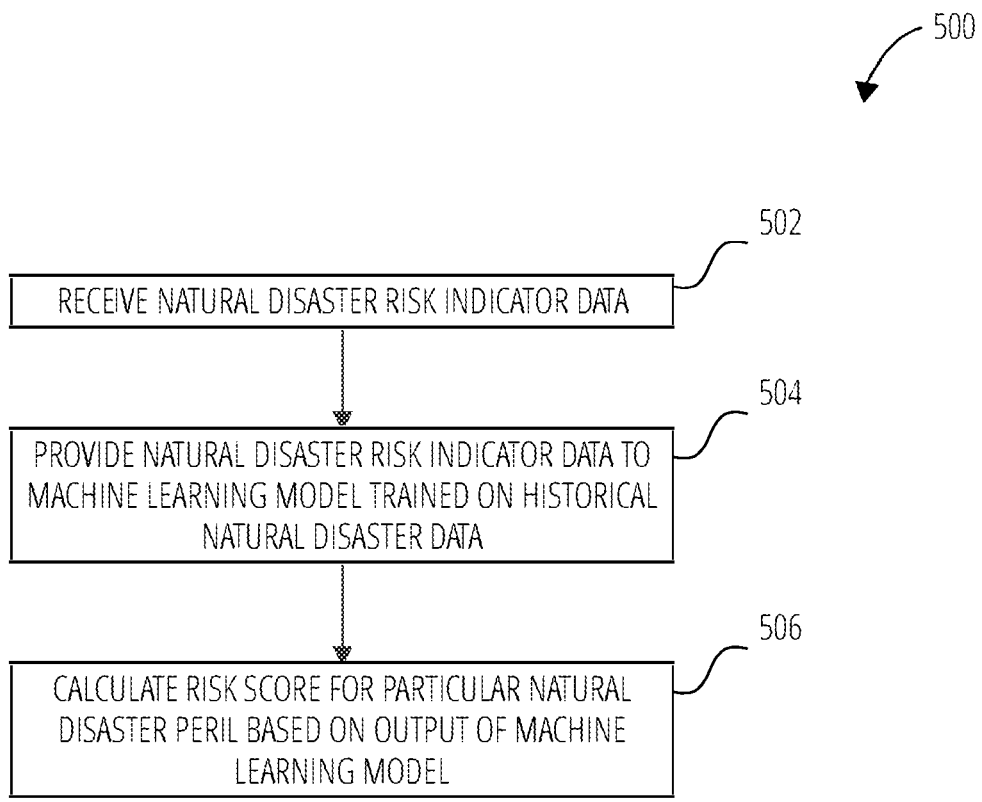
FIG. 5 is a schematic illustration of a method 500 arranged in accordance with examples described herein.

FIG. 5 is a schematic illustration of a method 500 arranged in accordance with examples described herein. The method 500 may be implemented by any of the computing systems described herein or combinations thereof. The method starts at step 502. At step 502, method 500 receives natural disaster risk indicator data. For example, as described with respect to FIG. 1, a computing system 102 may receive datasets and/or structure data from natural disaster data sources 104 and/or structure 122. In some implementations, the computing system 102 may receive datasets and/or structure data from various natural disaster data sources, such as smartphone 402, laptop 404, structures 408 and 410, satellite 412, satellite receiver 414, and drone 418.

At step 504, method 500 provides the natural disaster risk indicator data to a machine learning model trained on historical natural disaster data. For example, the processor(s) 106 of the computing system 102 may provide the obtained or received datasets and/or structure data to a memory 108 where a machine learning model is stored. At step 506, method 500 calculates a risk score for a particular natural disaster peril based on an output of the machine learning model. For example, the processor(s) 106 of the computing system 102 may implement the machine learning model to execute executable instructions to calculate risk score 110, which may include execute of executable instructions to normalize datasets 112, executable instructions to generate hazard model output 114, executable instructions to generate vulnerability model output 116, and/or executable instructions to combine hazard and vulnerability model outputs 118. Accordingly, the computing system 102 performs operations to calculate a risk score, when the processor(s) 106 executes, the executable instructions to calculate risk score 110, with such instructions including the feeding of the natural disaster indicator data to the machine learning model. The method 500 ends after step 506.

Figure 6:
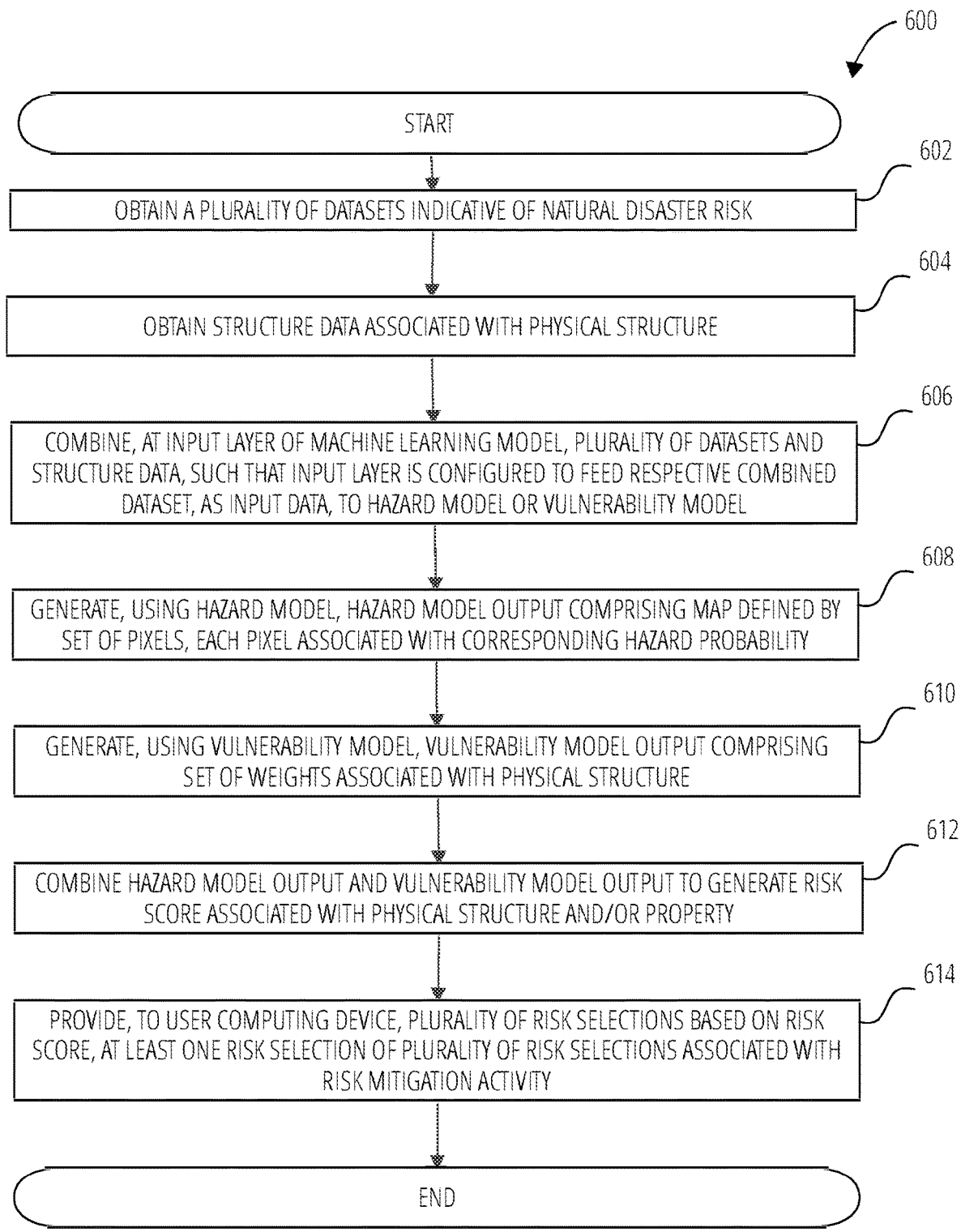
FIG. 6 is a schematic illustration of a method 600 arranged in accordance with examples described herein.

FIG. 6 is a schematic illustration of a method 600 arranged in accordance with examples described herein. The method 600 may be implemented by any of the computing systems described herein or combinations thereof. At step 602, method 600 obtains a plurality of datasets indicative of natural disaster risk. For example, as described with respect to FIG. 1, a computing system 102 may receive datasets from natural disaster data sources 104. In some implementations, the computing system 102 may receive datasets from various natural disaster data sources, such as smartphone 402, laptop 404, structures 408 and 410, satellite 412, satellite receiver 414, and drone 418. At step 604, method 600 obtains structure data associated with a physical structure. For example, as described with respect to FIG. 1, a computing system 102 may receive structure data, which may include property characteristic data, from structure 122. In some implementations, the computing system 102 may receive structure data from various natural disaster data sources, such as structures 408 and 410. As an example, IoT devices at the structures 408 and 410 may provide measurements of environmental data around the respective structures 408 and 410, e.g., temperature, wind speed and/or other weather information. Additionally or alternatively, property characteristic data may also be obtained from various natural disaster data sources, such as laptop 404, satellite 412, or drone 418. Advantageously, with measurements of temperature and wind speed from structures 408 and 410 of a wildfire adjacent to structure 408, one or more computing systems 102 may obtain real-time information regarding the wildfire to calculate risk scores for structures 408 and 410 and/or property, so as to provide risk selections to a user computing device 124 (e.g., smartphone 402) for a risk mitigation activity to minimize the loss from the wildfire adjacent to the structure 408 and/or property.

At step 606, method 600 combines, at an input layer of a machine learning model, the plurality of datasets and the structure data, such that the input layer is configured to feed a respective combined dataset, as input data, to a hazard model of the machine learning model or a vulnerability model of the machine learning model. In some implementations, the structure data includes property characteristic data. To obtain the respective combined datasets, as input data, the computing system 102 implements the method 700 to normalize the datasets and obtain the combined datasets, as described with respect to FIG. 7 below.

At step 608, method 600 generates, using the hazard model, a hazard model output comprising a map defined by a set of pixels, each pixel associated with a corresponding hazard probability. The hazard model of the machine learning model obtains combined datasets to process the several datasets in the hazard model, to generate a prediction regarding a natural disaster peril for various regions to which the combined datasets relate. The prediction may be a probability for a pixel of a map. As an example, a dataset may be a spatial layer of a geographic information system (GIS) map (e.g., a raster image file). The GIS map may include data representative of a region that the structure 122 is located within (e.g., pixel level data of a parcel that the structure 122 resides on) or a region associated with the structure 122 (e.g., State of California). The hazard model processes the normalized datasets, provided to the hazard model as a combined dataset, to generate a map defined by a set of pixels, with each pixel being associated with a corresponding hazard probability. For example, the processing of the normalized datasets may include the use of certain wildfire risk models that utilize the normalized datasets to generate hazard probabilities. A hazard probability corresponds to the natural disaster risk probability (e.g., a wildfire risk probability) for that pixel of the map. In some implementations, the hazard model may also include some of the plurality of datasets and/or structure data in the processing of the normalized datasets, such that such non-normalized datasets may also be utilized to generate the map defined by the set of pixels. Advantageously, the hazard model output provides a map with corresponding hazard probabilities for a particular natural disaster peril, which, as described herein, may be utilized to calculate a risk score (e.g., a wildfire risk score), so as to mitigate losses for structures and/or properties that are determined to be susceptible to such natural disaster risks (e.g., a wildfire).

At step 610, method 600 generates, using the vulnerability model, a vulnerability model output comprising a set of weights associated with the physical structure and/or property. Obtained structure data, property characteristic data, and/or other datasets from natural disaster data sources may be processed to generate a set of weights for the associated physical structure and/or property characteristics. For example, images obtained from a smartphone of a user who owns a structure 122, may indicate certain features of the structure 122 or a physical property associated with the structure 122. In some implementations, machine vision techniques are implemented by the computing system 102, which are configured to extract information or features about the physical structure 122, to generate at least a portion of the structure data. In the example, such information could provide various structural features indicative of natural disaster risk, such as: whether windows or other entry points to the structure 122 (e.g., chimneys) have mesh screens to catch and/or extinguish embers of a wildfire; available water sources adjacent to structure 122 (e.g., a pool or lake); whether a structure 122 includes storm windows (e.g., for hurricane risk), whether certain siding material is installed on the structure 122 (e.g., indicating susceptibility to a wildfire), whether certain vegetation is included in the area surrounding the structure 122, such as bushes (which may be more susceptible to certain types of wildfires). Structure data may also include parcel information from a government data source, such as historical natural disaster loss information for the structure 122. With such data obtained, the vulnerability model generates a set of weights, with each weight representative of a different feature regarding natural disaster risk susceptibility for the structure 122. Accordingly, the vulnerability model output corresponds to a set of weights associated with the physical structure and/or property. Advantageously, the vulnerability model output provides such weights for an associated physical structure and/or property characteristics, which, as described herein, may be utilized to calculate a risk score (e.g., a wildfire risk score), so as to mitigate losses for that structure that are determined to be susceptible to such natural disaster risks (e.g., a wildfire).

At step 612, method 600 combines the hazard model output and the vulnerability model output to calculate a risk score associated with the physical structure and/or property for a particular natural disaster peril. To combine the plurality of datasets and structure data, a computing system 102, implementing the method 600, obtains a set of risk correlations. The risk correlations are indicative of predetermined relationships of a certain dataset value and a natural disaster peril. For example, a wildfire relationship among flame length, ignition risk, wind speed, and/or type of wildfire may be indicative of a wildfire peril when correlated with certain data from various datasets. Accordingly, the risk correlations indicate whether a relationship of a certain dataset is correlated with a natural disaster peril.

Further, to combine the datasets and structure data, the computing system 102, implementing the method 600, obtains the hazard and vulnerability model outputs: the map defined by a set of pixels, with each pixel associated with a corresponding hazard probability, and the set of weights associated with the physical structure and/or the property characteristics, respectively. The computing system 102 determines whether a respective risk correlations is associated with an aspect of the map defined by a set of pixels using the set of risk correlations. For example, the computing system 102 may apply a set of heuristic rules, where each heuristic rule is associated with a respective risk correlation of the set of risk correlations. A heuristic rule may be an IF-THEN operation. As an example, if a corresponding pixel of a flame length spatial layer is greater than 90 ft (e.g., as normalized to >0.25) and a corresponding pixel of an ignition risk spatial layer is greater than 25%, then a pixel of the hazard model output may be associated with a certain risk correlation for a natural disaster peril, e.g., a wildfire peril. Accordingly, the corresponding hazard probability for that pixel may be associated with a particular natural disaster peril. For example, an aspect of the map may be a particular region of the map, such that the heuristic rule is applied to all or some pixels of that region. The region of pixels that is determined is based on a region associated with a region of the structure 122, as indicated by certain structure data and/or datasets. In some implementations, a heuristic rule may include a threshold comparison of a selected risk correlation with an aspect of the map. As an example, a selected risk correlation may be a qualitative category or designation: low, medium, high, critical, etc. . . . In example, the rule may compare each pixel of a flame length spatial layer to a certain threshold (e.g., greater than a normalized 0.5 value), to identify that those pixels are to be associated with a "critical" wildfire risk, which may augment the corresponding hazard probability for that pixel. Accordingly, each of the pixels of the map generated by the hazard model be associated with that "critical" wildfire risk.

Continuing at step 612, the computing system 102 weights each of the pixels of the map in accordance with the set of weights associated with the structure 122, for each of the respective risk correlations that are associated with an aspect of the map, to calculate a risk score for a particular natural disaster peril associated with the structure 122. Accordingly, varying combinations may be utilized (e.g., selection a certain portion of a region surrounding the structure 122) to apply the weights to certain pixels of the map, and to calculate a singular risk score that expresses the combination of the set of weights associated with the structure 122 to all or a portion of the map with corresponding hazard probabilities. Accordingly, the computing system 102 combines the weighted pixels to calculate the risk score. Advantageously, the calculated risk score is indicative of a particular natural disaster peril for a particular structure, such that the calculated risk score may be utilized as indicate to a user or other provider (e.g., an insurance provider) a risk of a natural disaster peril, such as a wildfire peril. Accordingly, the method 600 may allow potential losses for that structure to be mitigated as those losses may relate to a particular susceptibility of a natural disaster risk (e.g., a wildfire) for that structure.

At step 614, method 600 provides, to a user computing device (e.g., user computing device 124), a plurality of risk selections based on the calculated risk score, where at least one risk selection of the plurality of risk selections is associated with a risk mitigation activity. In calculating the risk score, a plurality of risk selections may be provided to a user computing device, with those risk selections being associated with that risk score. For example, if the risk score passes a first threshold, a first plurality of risk selections may be provided; and if the risk score passes a second threshold, a second plurality of risk selections may additionally be provided. In various implementations, a user of user computing device may select a certain risk selections of either plurality of risk selections that may be associated with a particular risk mitigation activity. As an example, a risk selection may be provided to be displayed on the user computing device that indicates: "Remove dead bushes from yard." In such a case, the user may select that risk selection to notify the user regarding that risk mitigation activity, e.g., that activity may be added to a todo list of the user or calendared to notify the user regarding that risk mitigation activity. In some implementations, a risk selection may include options for an insurance policy associated with the natural disaster peril based on the risk score. For example, a user of a user computing device may be provided a wildfire insurance policy based on a risk score for a wildfire associated with a particular physical structure (e.g., a residential home structure of the user) and/or property (e.g., a property associated with the particular physical structure). Accordingly, a risk mitigation activity may include selecting a wildfire insurance policy for that particular physical structure and/or property. Additionally or alternatively, the calculated risk score may be provided to user computing devices at various risk mitigation services (e.g., vegetation removal), municipal standard agencies (e.g., building code development or home builder standards development), or insurance underwriters that use the risk score, in part, to determine a property insurance policy.

Figure 7:
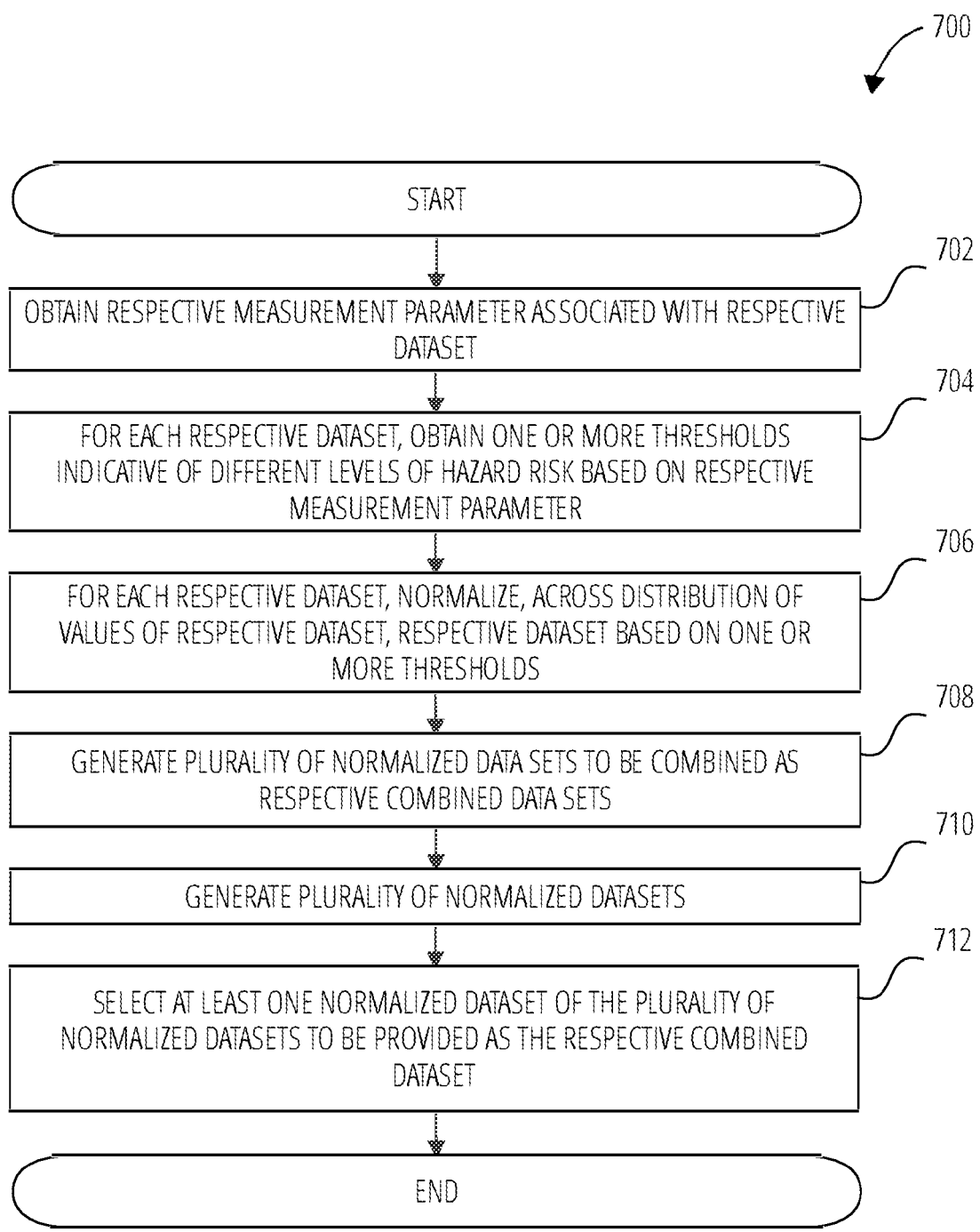
FIG. 7 is a schematic illustration of a method 700 arranged in accordance with examples described herein.

FIG. 7 is a schematic illustration of a method 700 arranged in accordance with examples described herein. The method 700 may be implemented by any of the computing systems described herein or combinations thereof. As a particular example, the method 700 may be implemented by the computing system 202, when executing the executable instructions to normalize datasets 208. As described with respect to those executable instructions 208 at FIG. 2, the method 700 may be implemented to generate the normalized datasets, so as to provide a respective combined dataset to one or more input layers of a machine learning model (e.g., the hazard model or the vulnerability model). Accordingly, at step 702, method 700 obtains a respective measurement parameter associated with a respective dataset of the plurality of datasets. At step 704, method 700 obtains one or more thresholds indicative of different levels of risk based on the respective measurement parameter, for each respective dataset of the plurality of datasets. At step 706, method 700 obtains one or more thresholds indicative of different levels of risk based on the respective measurement parameter, for each respective dataset of the plurality of datasets. At step 708, method 700 normalizes, across a distribution of values of the respective dataset, the respective dataset based on the one or more thresholds. At step 710, method 700 generates a plurality of normalized datasets. At step 712, method 700 selects at least one normalized dataset of the plurality of normalized datasets to be provided as the respective combined datasets.

The functions described herein may be implemented in hardware, software executed by a processor, firmware, or any combination thereof. If implemented in software executed by a processor, the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, optical disk storage, removable/non-removable computer-readable media, volatile/non-volatile computer-readable medium. magnetic disk storage, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above are also included within the scope of computer-readable media.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific examples have been described herein for purposes of illustration, various modifications may be made while remaining with the scope of the claimed technology. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method comprising:
receiving vegetation data and at least one of natural disaster risk indicator data, structure data, property characteristics data, or weather data;
providing the vegetation data and the at least one of the natural disaster risk indicator data, the structure data, the property characteristics data, or the weather data to a model comprising at least one of a hazard model, a vulnerability model, or a machine learning (ML) model trained on historical natural disaster data, the ML model comprising the hazard model and the vulnerability model;
generating, based at least in part on the model, at least one output; and
calculating a risk score for a particular natural disaster peril based at least in part on the at least one output.

2. The method of claim 1, further comprising:
calculating a risk selection based at least in part on the risk score;
transmitting, across a data network, the risk selection to a user computing device; and
causing presentation by a graphical user interface (GUI) of the user computing device, of an indication of the risk selection, the indication notifying a user of the user computing device regarding a risk mitigation activity.

3. The method of claim 1, further comprising:
combining, at an input layer of the model, the vegetation data and the at least one of the natural disaster risk indicator data, the structure data, the property characteristics data, or the weather data, such that the input layer is configured to feed a respective dataset, as input data, to the hazard model, the vulnerability model, or the ML model.

4. The method of claim 1, further comprising:
wherein the natural disaster risk indicator data comprises spatial layers of a geographic information system (GIS) map, wherein the structure data comprises parcel information associated with a physical structure, and wherein the property characteristics data comprises at least one of laptop data, satellite data, or drone data and is associated with a property having the physical structure.

5. The method of claim 1, wherein receiving the vegetation data and the at least one of the natural disaster risk indicator data, the structure data, the property characteristics data, or the weather data further comprises receiving, as input data, the vegetation data and two or more of the natural disaster risk indicator data, the structure data, the property characteristics data, or the weather data, and the method comprises providing the input data to the model.

6. The method of claim 1, wherein the at least one of the natural disaster risk indicator data, the structure data, the property characteristics data, or the weather data comprises the weather data, wherein receiving the vegetation data and the at least one of the natural disaster risk indicator data, the structure data, the property characteristics data, or the weather data further comprises receiving the vegetation data, the weather data, and at least one of the natural disaster risk indicator data, the structure data, or the property characteristics data, and wherein providing the vegetation data and the at least one of the natural disaster risk indicator data, the structure data, the property characteristics data, or the weather data comprises providing the vegetation data, the weather data, and the at least one of the natural disaster risk indicator data, the structure data, or the property characteristics data to the model.

7. The method of claim 1, wherein the at least one of the natural disaster risk indicator data, the structure data, the property characteristics data, or the weather data comprises the natural disaster risk indicator data and the weather data, wherein receiving the vegetation data and the at least one of the natural disaster risk indicator data, the structure data, the property characteristics data, or the weather data further comprises receiving the vegetation data, the natural disaster risk indicator data, the weather data, and at least one of the structure data or the property characteristics data, and wherein providing the vegetation data and the at least one of the natural disaster risk indicator data, the structure data, the property characteristics data, or the weather data comprises providing the vegetation data, the natural disaster risk indicator data, the weather data, and the at least one of the structure data or the property characteristics data to the model.

8. The method of claim 1, wherein providing the vegetation data and the at least one of the natural disaster risk indicator data, the structure data, the property characteristics data, or the weather data further comprises providing the vegetation data and the at least one of the natural disaster risk indicator data, the structure data, the property characteristics data, or the weather data to the hazard model of the ML model, wherein generating the at least one output further comprises generating based at least in part on analysis performed by the hazard model, a hazard model output that comprises a hazard probability associated with a wildfire risk probability, and wherein calculating the risk score further comprises calculating the risk score as a wildfire risk score based at least in part on the hazard model output.

9. The method of claim 1, wherein the at least one of the natural disaster risk indicator data, the structure data, the property characteristics data, or the weather data comprises the structure data, wherein the structure data is associated with a physical structure and a property, and wherein receiving the vegetation data and the at least one of the natural disaster risk indicator data, the structure data, the property characteristics data, or the weather data further comprises:

receiving, from a user computing device, user input identifying information associated with the physical structure and the property; and receiving the structure data based on the user input.

10. The method of claim 1, wherein providing the vegetation data and the at least one of the natural disaster risk indicator data, the structure data, the property characteristics data, or the weather data further comprises:

activating first input nodes of the hazard model and second input nodes of the vulnerability model; and providing datasets to the first input nodes of the hazard model and the second input nodes of the vulnerability model, individual ones of the datasets comprising a portion of the vegetation data and at least one respective portion of the natural disaster risk indicator data, the structure data, the property characteristics data, or the weather data, individual ones of the datasets corresponding to a spatial layer of a geographic information system (GIS) map.

11. A system comprising:

one or more processors; and one or more non-transitory computer readable media encoded with executable instructions that, when executed by the one or more processors, cause the system to perform operations comprising:

receiving at least one of vegetation data or weather data, and at least one of natural disaster risk indicator data, structure data, or property characteristics data;

providing the at least one of the vegetation data or the weather data, and the at least one of the natural disaster risk indicator data, the structure data, or the property characteristics data to a model comprising at least one of a hazard model, a vulnerability model, or a machine learning (ML) model trained on historical natural disaster data, the ML model comprising the hazard model and the vulnerability model;

generating output data based at least in part on analysis performed by the model; and calculating a risk score for a particular natural disaster peril based at least in part on the output data.

12. The system of claim 11, the operations further comprising:

calculating a risk selection based at least in part on the risk score;

transmitting, across a data network, the risk selection to a user computing device; and causing presentation by a graphical user interface (GUI) of the user computing device, of an indication of the risk selection, the indication notifying a user of the user computing device regarding a risk mitigation activity.

13. The system of claim 11, identifying datasets that comprise a first dataset and a second dataset, individual ones of the datasets comprising at least one respective first portion of the at least one of the vegetation data or the weather data, and at least one respective second portion of the at least one of the natural disaster risk indicator data, the structure data, or the property characteristics data, wherein providing the at least one of the vegetation data or the weather data, and the at least one of the natural disaster risk indicator data, the structure data, or the property characteristics data further comprises providing the first dataset to the hazard model and the second dataset to the vulnerability model, respectively, wherein generating the output data of the model further comprises generating the output data that comprises a hazard model output and a vulnerability model output based at least in part on analysis of the first dataset and the second dataset performed by the hazard model and the vulnerability model, respectively, and wherein the operations further comprise:
  obtaining labels indicative of historical data;
  training the hazard model using a first model technique of at least one model technique, the at least one model technique comprising a random forest classifier configured to classify the datasets using one or more decision trees, the first model technique being configured to classify the first dataset based partly on a first group of the labels; and
  training the vulnerability model using a second model technique of the at least one model technique, the second model technique being configured to classify the second dataset based partly a second group of the labels.

14. The system of claim 11, wherein the output data comprises a map defined by a set of pixels, and generating the output data further comprises:
  obtaining a set of risk correlations;
  for individual ones of the risk correlations, weighting a pixel of the set of pixels in accordance with a weight from among a set of weights, individual ones of the weights being associated with a physical structure; and
  combining the weighted pixels to calculate the risk score.

15. The system of claim 11, wherein the output data comprises a map defined by a set of pixels, and generating the output data further comprises:
  obtaining a set of risk correlations based at least in part on a set of heuristic rules, individual ones of the heuristic rules comprising a threshold comparison of a selected risk correlation of the set of risk correlations with a pixel of the set of pixels associated with a region of a physical structure; and
  generating the output data based at least in part on the set of risk correlations.

16. The system of claim 11, wherein receiving the at least one of vegetation data or the weather data, and the at least one of the natural disaster risk indicator data, the structure data, or the property characteristics data further comprises receiving datasets, individual ones of the datasets comprising at least one first respective portion of vegetation data or the weather data, and at least one second respective portion of the at least one of the natural disaster risk indicator data, the structure data, or the property characteristics data,
  wherein providing the at least one of the vegetation data or the weather data, and the at least one of the natural disaster risk indicator data, the structure data, or the property characteristics data further comprises:
    obtaining thresholds, individual ones of the thresholds being obtained based on, or independent of, a measurement parameter, individual ones of the thresholds being indicative of a level of risk;
    normalizing, across a corresponding distribution of values, individual ones of the datasets as a normalized dataset from among a plurality of normalized datasets based on a corresponding threshold from among the thresholds,
    selecting at least one of the plurality of normalized datasets to be provided as at least one selected dataset; and
    providing the at least one selected dataset to the model.

17. One or more non transitory computer readable media storing instructions executable by one or more processors, wherein the instructions, when executed, cause the one or more processors to perform operations comprising:
  receiving at least one of vegetation data or weather data, and at least one of natural disaster risk indicator data, structure data, or property characteristics data;
  providing the at least one of the vegetation data or the weather data, and the at least one of the natural disaster risk indicator data, the structure data, or the property characteristics data to a model comprising at least one of a hazard model, a vulnerability model, or a machine learning (ML) model trained on historical natural disaster data, the ML model comprising the hazard model and the vulnerability model;
  generating output data based at least in part on analysis performed by the model; and
  calculating a risk score for a particular natural disaster peril based at least in part on the output data.

18. The one or more non transitory computer readable media of claim 17, wherein the output data comprises a map defined by a set of pixels, and generating the output data further comprises:
  obtaining a set of risk correlations based at least in part on a set of heuristic rules, individual ones of the heuristic rules comprising a threshold comparison of a selected risk correlation of the set of risk correlations with a pixel of the set of pixels associated with a region of a physical structure; and
  generating the output data based at least in part on the set of risk correlations.

19. The one or more non transitory computer readable media of claim 17, wherein providing the vegetation data and the at least one of the natural disaster risk indicator data, the structure data, the property characteristics data, or the weather data further comprises:
  obtaining thresholds, individual ones of the thresholds being indicative of a level of risk;
  selecting, as a selected dataset, a dataset of a plurality of datasets based on the thresholds, individual ones of the datasets comprising a portion of the vegetation data and at least one respective portion of the at least one of the natural disaster risk indicator data, the structure data, the property characteristics data, or the weather data; and
  providing the selected dataset to the model,
  wherein at least one threshold of the thresholds corresponds to at least one respective level of risk associated with at least one respective on-the-ground management activity.

20. The one or more non transitory computer readable media of claim 17, wherein the at least one of the natural disaster risk indicator data, the structure data, the property characteristics data, or the weather data comprises the structure data, and
  wherein receiving the vegetation data and the at least one of the natural disaster risk indicator data, the structure data, the property characteristics data, or the weather data further comprises:

obtaining, from a user computing device, user input comprising information about a physical structure and a property; and obtaining a portion of the structure data associated with the physical structure and the property.

* * * * *